US012198716B2

(12) United States Patent
Modi

(10) Patent No.: US 12,198,716 B2
(45) Date of Patent: *Jan. 14, 2025

(54) AUDIO PLAYOUT REPORT FOR RIDE-SHARING SESSION

(71) Applicant: Gracenote, Inc., Emeryville, CA (US)

(72) Inventor: Nisarg A. Modi, San Ramon, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,648

(22) Filed: Nov. 1, 2023

(65) Prior Publication Data

US 2024/0062772 A1 Feb. 22, 2024

Related U.S. Application Data

(63) Continuation of application No. 18/156,311, filed on Jan. 18, 2023, now Pat. No. 11,837,250, which is a continuation of application No. 17/729,624, filed on Apr. 26, 2022, now Pat. No. 11,581,011, which is a continuation of application No. 17/190,061, filed on Mar. 2, 2021, now Pat. No. 11,348,600, which is a continuation of application No. 16/516,048, filed on Jul. 18, 2019, now Pat. No. 10,997,985.

(60) Provisional application No. 62/714,624, filed on Aug. 3, 2018.

(51) Int. Cl.
G10L 25/51 (2013.01)
G06F 3/16 (2006.01)
G06F 16/68 (2019.01)
G06F 16/683 (2019.01)

(52) U.S. Cl.
CPC .............. *G10L 25/51* (2013.01); *G06F 3/165* (2013.01); *G06F 16/683* (2019.01); *G06F 16/686* (2019.01)

(58) Field of Classification Search
CPC ............................. G06F 16/683; G06F 16/687
See application file for complete search history.

(56) References Cited

U.S. PATENT DOCUMENTS

| 2011/0202393 A1 | 8/2011 | DeWakar et al. |
| 2013/0179072 A1 | 7/2013 | Martin et al. |
| 2014/0012572 A1 | 1/2014 | Herberger et al. |

(Continued)

FOREIGN PATENT DOCUMENTS

KR  1020140076693 A  6/2014

OTHER PUBLICATIONS

International Search Report mailed on Oct. 31, 2019 issued in connection with International Application No. PCT/US2019/043088, filed on Jul. 23, 2019, 3 pages.

(Continued)

*Primary Examiner* — Kile O Blair
(74) *Attorney, Agent, or Firm* — McDonnell Boehnen Hulbert & Berghoff LLP

(57) ABSTRACT

In one aspect, an example method to be performed by a computing device includes (a) determining that a ride-sharing session is active; (b) in response to determining the ride-sharing session is active, using a microphone of the computing device to capture audio content; (c) identifying reference audio content that has at least a threshold extent of similarity with the captured audio content; (d) determining that the ride-sharing session is inactive; and (e) outputting an indication of the identified reference audio content.

20 Claims, 7 Drawing Sheets

(56) References Cited

U.S. PATENT DOCUMENTS

2017/0251163 A1 8/2017 Ochiai et al.
2018/0102017 A1 4/2018 Brinig et al.

OTHER PUBLICATIONS

Written Opinion of the International Searching Authority mailed on Oct. 31, 2019 issued in connection with International Application No. PCT/US2019/043088, filed on Jul. 23, 2019, 6 pages.

AUDIO PLAYOUT REPORT FOR RIDE-SHARING SESSION

CROSS-REFERENCE TO RELATED APPLICATIONS

This application is a continuation of U.S. patent application Ser. No. 18/156,311, filed Jan. 18, 2023, which is a continuation of U.S. patent application Ser. No. 17/729,624, filed Apr. 26, 2022, which is a continuation of U.S. patent application Ser. No. 17/190,061, filed on Mar. 2, 2021, now U.S. Pat. No. 11,348,600, which is a continuation of U.S. patent application Ser. No. 16/516,048, filed on Jul. 18, 2019, now U.S. Pat. No. 10,997,985, which claims priority to U.S. Provisional Application No. 62/714,624, filed on Aug. 3, 2018, the contents of each of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

BACKGROUND

Ride-sharing systems allow commuters to request shared rides to various destinations. Such shared rides can often be requested on demand. Examples of ride-sharing systems include UBER®, LYFT®, and CURB®, but other example ride-sharing systems are available as well. Furthermore, as used herein, "ride-sharing" and/or "ride-sharing session" can include situations where the user is using a ride-sharing system or application to carpool with other passengers at different locations (e.g., UBERPOOL®) or not (e.g., UBERX®).

SUMMARY

In one aspect, an example computing device is disclosed. The example computing device comprises (a) a microphone, (b) one or more processors, and (c) a non-transitory, computer-readable medium storing instructions that, when executed by the one or more processors, cause the computing device to perform a set of acts comprising: (a) determining that a ride-sharing session is active; (b) in response to determining the ride-sharing session is active, using the microphone of the computing device to capture audio content; (c) identifying reference audio content that has at least a threshold extent of similarity with the captured audio content; (d) determining that the ride-sharing session is inactive; and (e) outputting an indication of the identified reference audio content.

In another aspect, an example method to be performed by a computing device is disclosed. The method includes (a) determining that a ride-sharing session is active; (b) in response to determining the ride-sharing session is active, using a microphone of the computing device to capture audio content; (c) identifying reference audio content that has at least a threshold extent of similarity with the captured audio content; (d) determining that the ride-sharing session is inactive; and (e) outputting an indication of the identified reference audio content.

In another aspect, an example non-transitory computer-readable medium is disclosed. The computer-readable medium has stored thereon program instructions that, upon execution by a computing system, cause the computing system to perform a set of operations comprising (a) determining that a ride-sharing session is active; (b) in response to determining the ride-sharing session is active, using a microphone of a computing device to capture audio content; (c) identifying reference audio content that has at least a threshold extent of similarity with the captured audio content; (d) determining that the ride-sharing session is inactive; and (e) outputting an indication of the identified reference audio content.

DETAILED DESCRIPTION

I. Overview

Figure 1:
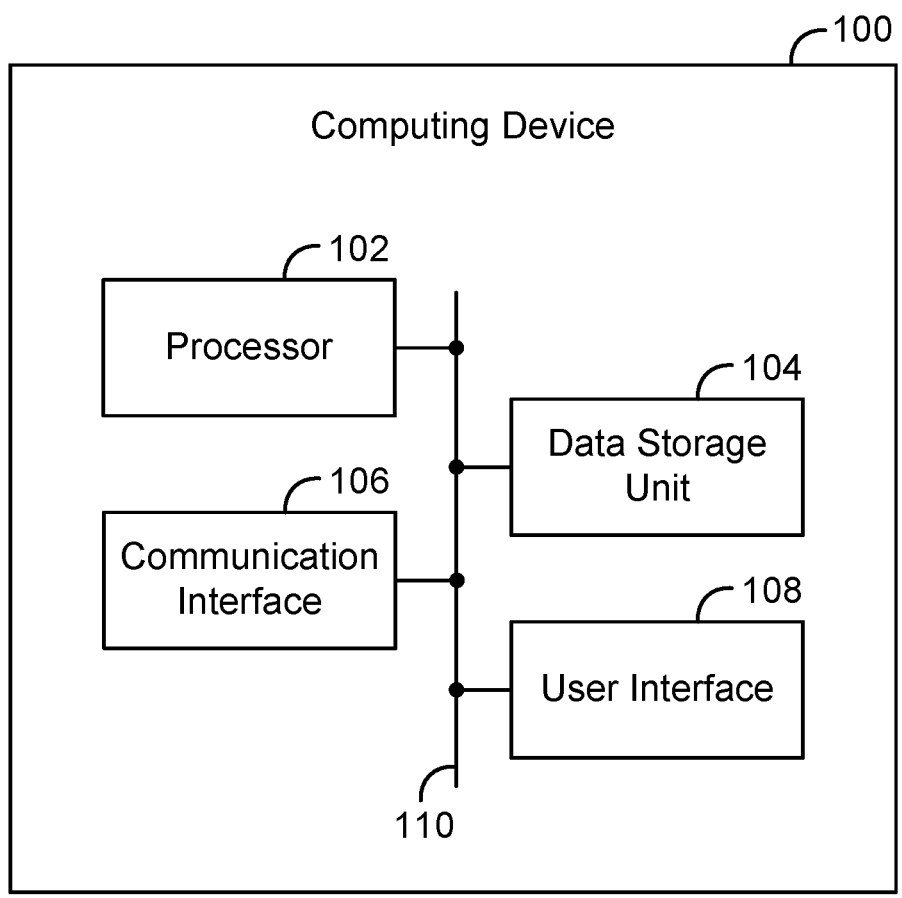
FIG. 1 is a simplified block diagram of an example computing device.

During a ride-sharing session, the driver of the vehicle may provide entertainment to the passenger(s), for instance, by playing music through a media system of the vehicle. The driver can play music from a radio broadcast, or the driver can play stored music, such as music stored on a mobile phone, an MP3 player, or a compact disc.

After the ride-sharing session, the passenger may wish to identify one or more songs that were played during the ride-sharing session. For instance, the passenger may have enjoyed a particular song that was played, and the passenger may wish to purchase the song for further listening. However, before the passenger is able to purchase the song, the passenger may forget which songs were played during the ride-sharing session.

Disclosed herein are methods and systems to address this and potentially other issues. In an example method, a computing device can determine when a ride-sharing session is active. While the ride-sharing session is active, the computing device can use audio fingerprints to identify audio content presented by a media system of a vehicle. For example, in response to determining the ride-sharing session is active, using a microphone of the computing device to capture audio content, the computing device may identify reference audio content that has at least a threshold extent of similarity with the captured audio content.

The computing device can identify information about the audio content in various ways. For instance, the computing device can determine an audio fingerprint associated with the audio content, transmit the fingerprint to a server and, in response, receive metadata associated with the fingerprint from the server. In another aspect, the computing device can send the captured audio content (or a portion thereof) to a server, and the server can generate an audio fingerprint of the audio content. The server can then identify metadata associated with the fingerprint and transmit the identified metadata to the computing device.

In any case, once the computing device obtains the metadata, the computing device may associate the metadata with a map identifying a route taken during the ride-sharing session. In one example, after the ride-sharing session ends, based on this association, the computing device can also provide an audio playout report to a passenger of the ride-sharing session. This audio playout report can include displaying the map and a GUI containing information in the metadata imposed on the displayed map. For example, this displayed map and GUI may include: (1) a first segment of the route and metadata indicating a first identified reference audio content corresponding to audio content captured during that portion of the ride-sharing session; and (2) a second segment of the route and metadata indicating a second identified reference audio content corresponding to audio content captured during that portion of the ride-sharing session.

For context, this metadata may indicate an artist, song title, album title, album cover, genre, year of release, or various other identifying information of the audio content. In this manner, by displaying information contained in the metadata when the user views the displayed map, the computing device can provide the user with information identifying the audio content that is and/or was playing in the environment of the computing device at the time the ride-sharing session was active. Additionally, the computing device can provide a similar functionality while the ride-sharing session is active (e.g., displaying a map and a GUI containing information in metadata associated with audio content that is playing during the ride-sharing session). Other examples are possible.

This audio playout report can also be presented as a list of the audio content played during the ride-sharing session and metadata associated therewith (e.g., metadata indicating information of the audio content played in the environment of the computing device at the time the ride-sharing session was active and specific locations and/or times at which the audio content was played during the ride-sharing session).

In a further aspect, the computing device can use the associated metadata to play back a version of the previously captured audio content. For example, as noted above, because the metadata can include various identifying information of the audio content, the computing device can also use the metadata to retrieve and play a version of the identified audio content. The computing device can retrieve the version of the identified audio content from local storage on the computing device or from an audio streaming service. The version may be a studio-recorded version or a live concert version of the audio content, as a sound quality of these versions is likely to be higher than a sound quality of the audio content captured by the computing device. In these examples, the computing device can also display a GUI that allows the user to interact with and control playback of the audio content (e.g., via a "pause" button, volume control slider, etc.), and that displays information contained in the metadata and associated with the audio content, as described above.

II. Example Architecture

A. Computing Device

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a radio, cellular, or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

In this disclosure, the term "computing system" means a system that includes at least one computing device, such as computing device 100. A computing system and/or components thereof can perform various acts, such as those set forth below.

III. Example Operations

During a ride-sharing session, a computing device can determine that the ride-sharing session is active. The computing device may, for example, be a mobile computing device (e.g., a smartphone) of the driver and/or of the passenger, or the computing device may be the media system of the vehicle. The computing device can be configured to execute one or more software applications for facilitating the ride-sharing session. The passenger can use the software application to request the shared ride in the first instance, and the driver can use the software application to accept the requested ride and to navigate to the passenger's destined location. The software application can track a current location of the vehicle (e.g., using a GPS module of the computing device) and can provide the driver with directions for navigating to the destined location. Accordingly, in some examples, the computing device can use the ride-sharing software application to determine that the ride-sharing session is active based on detecting a ride request or an acceptance of the ride request or based on detecting the use of GPS navigation. Other examples are possible as well.

Responsive to determining that the ride-sharing session is active, and while the ride-sharing session is active, the computing device can use audio fingerprint data to identify audio content presented by a media system of a vehicle. To facilitate this, the computing device can include a microphone that the computing device can use to capture audio content in an environment of the computing device. For instance, during the ride-sharing session, the computing device can use its microphone to capture music that is being played by the media system of the vehicle.

In another example, the computing device may be configured to continuously or periodically monitor audio content in the environment of the computing device during background processing and begin capturing the audio only upon recognizing one or more predetermined phrases (e.g., "Activate ride-share song detection"). In this way, while the audio content in the environment around the computing device is continuously or periodically monitored for engagement by the user, the audio content may only be captured for the purpose of song detection upon such engagement by the user.

In yet another example, the computing device may be configured to continuously or periodically capture the audio content that is being played in the environment for performing song-detection analysis. In some examples, the computing device may continuously or periodically capture the audio content and perform audio analysis (e.g., fingerprinting, finding other audio content that matches the captured audio content, etc.) in real time or near real time. In other examples, however, the computing device may continuously or periodically capture the audio content and defer audio analysis until a later time using one or more methods (e.g., by timestamping the captured audio content and, at a later time, matching it with a ride-sharing session route segment with a same (or similar) timestamp).

In any case, the computing device can determine a fingerprint for the captured audio content. The computing device can determine the fingerprint according to any audio fingerprinting process now known or later developed. In some examples, the computing device can, in real time as the computing device captures the audio content, determine audio fingerprint data based on the captured audio content. For instance, the computing device itself can generate the audio fingerprint data based on the captured audio content, or the computing device can send the captured audio content to another computing device, such as a network server, that can generate the audio fingerprint data based on the captured audio content.

Once the audio fingerprint data has been determined, the audio fingerprint data can be used to identify the audio content that is playing in the vehicle. For instance, the computing device or the network server can compare the audio fingerprint data with reference audio fingerprint data representing audio content of known media (e.g., of known songs).

The computing device, the network server, or other such entity could establish or otherwise have access to reference audio fingerprint data representing the known media. For instance, the server could receive various songs and, for each song, could generate respective reference audio fingerprints representing the respective songs. Or the server could otherwise establish or be provisioned with these reference audio fingerprints. In any case, the reference fingerprints can be generated according to any audio fingerprinting process now known or later developed. The server can further associate each reference audio fingerprint with information identifying the media content that corresponds to the reference audio fingerprint. For instance, each reference audio fingerprint can be associated with a song title, artist, genre, album title, release year, or various other information describing the media content.

The computing device can query the server with the audio fingerprint data that was generated based on the audio content captured in the vehicle during the ride-sharing session, and the server can compare the query audio fingerprint data with the reference audio fingerprint data of the known media. And if the server thereby determines with sufficient confidence that the query audio fingerprint data matches particular reference audio fingerprint data, then the server could conclude that the audio content played in the vehicle and captured by the computing device is the known media represented by the particular reference audio fingerprint data. Further, upon coming to such a conclusion, the server could transmit, to the computing device, the descriptive information associated with the media represented by the particular reference audio fingerprint data (e.g., the title, artist, genre, album title, and/or release year of the media content).

In other examples, the computing device may perform some or all of these functions locally, on the computing device itself.

In any case, once the audio content that is being played in the vehicle has been identified, the computing device can store, in a data storage of the computing device, an indication of the identified audio content. The stored indication can take various forms. For instance, the indication can include the descriptive information received from the server. Additionally, the indication can include data representing a time at which the audio content was detected in the vehicle and/or a location (e.g., based on GPS coordinates of the computing device when the audio content is captured) where the audio content was detected.

Over the duration of the ride-sharing session, the computing device can continue to capture audio content, determine audio fingerprint data, query the server for identifying audio content, and store indications of the identified audio content as described above. As such, the computing device can generate a log identifying which songs were played during the ride-sharing session.

The computing device can also determine that the ride-sharing session is inactive (e.g., by detecting that the passenger has reached the destination and/or completed payment). After the ride-sharing session ends, based on the identified audio content, the computing device can provide an audio playout report to a passenger of the ride-sharing session. For instance, the computing device can determine that the ride-sharing session has ended based on the ride-sharing software application indicating that the passenger's ride has been completed and/or based on the GPS module of the computing device determining that the passenger has reached their destination. Responsive to determining that the ride-sharing session has ended, the computing device can display to the passenger the audio playout report identifying which songs were played during the ride-sharing session. The audio playout report can include various information obtained from the server about the identified songs (e.g., title, artist, genre, album title, and/or release year) as well as information identifying when and/or where the songs were played.

In some examples, the audio playout report includes a map interface for identifying which songs were played during the ride-sharing session. For instance, the computing device can generate a map that includes a marked path indicating a route of the vehicle during the ride-sharing session. The marked path can be separated into segments, where each segment represents (i) a respective song that was playing in the vehicle during the ride-sharing session and (ii) a location of the vehicle when the identified song was playing. The map interface can be an interactive interface, such that when the passenger selects a segment of the marked path, the map interface displays information identifying the respective song represented by the selected segment.

In other examples, this playout report can be presented as a list of the audio content played during the ride-sharing session and the metadata associated therewith. In a further aspect, the computing device may use the associated metadata to play back a version of the previously captured audio content. For example, as noted above, the metadata can include various identifying information of the audio content, such that the computing device can use the metadata to retrieve and play a version of the identified audio content.

In some examples, the computing device can retrieve the version of the identified audio content from local storage on the computing device or from an audio streaming service. In other examples, the computing device may only store a small portion of data associated with the captured audio content, the ride-sharing session, and/or both, and stream and/or retrieve other types of data associated with the audio content from various sources (e.g., network servers), only after the ride-sharing session has ended. Other examples are possible as well.

In any case, before or pursuant to playing back the audio content, the computing device can also display a GUI that allows the user to interact with and control the audio content that is being played via the computing device (e.g., a "pause" button, volume control slider, etc.). In a further aspect, the computing device can also display a GUI displaying information contained in the metadata and associated with the audio content (e.g., the name of the artist, album title, or album cover associated with the audio content). Other examples are possible as well.

A. Example GUIs and Operational Environments

To further illustrate the above-described concepts and others, FIGS. 2A-2D depict example GUIs that a computing device 200 can be configured to display based on example operating environments of the computing device 200. The computing device 200 can be similar or the same as the computing device 100 depicted in FIG. 1. In the present examples, the computing device 200 is depicted as a mobile computing device, but can take other forms in other examples. For instance, the computing device 200 can be a laptop, tablet, or the like. Further, the example environments and GUIs depicted in FIGS. 2A-2D are merely for purposes of illustration. The features described herein can involve environments, operations, GUIs, and functionalities that are configured or formatted differently, include additional or fewer components and/or more or less data, include different types of components and/or data, and relate to one another in different ways.

Figure 2A:
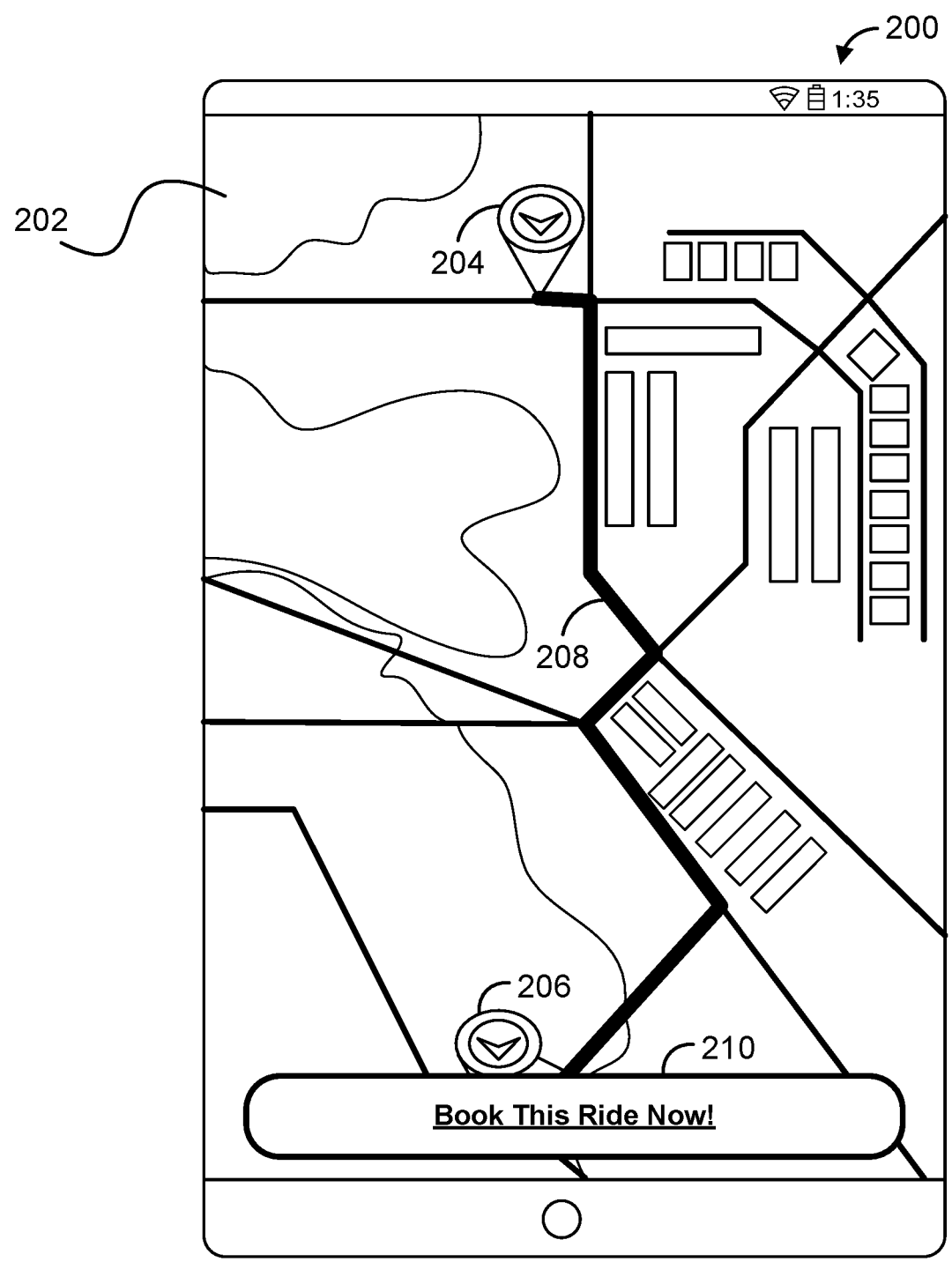
FIG. 2A is an example graphical user interface ("GUI") in a first state.

FIG. 2A depicts an example GUI of the mobile computing device 200 in a first state. Specifically, in this first state, the mobile computing device 200 displays a map 202 in connection with two points of interest for a potential ride-sharing session—pick-up point 204 and drop-off point 206. In this state, mobile computing device 200 also displays a suggested ride-sharing session route 208 between pick-up point 204 and drop-off point 206, as well ride-sharing session request icon 210, which the potential passenger can use to request the shared ride.

Figure 2B:
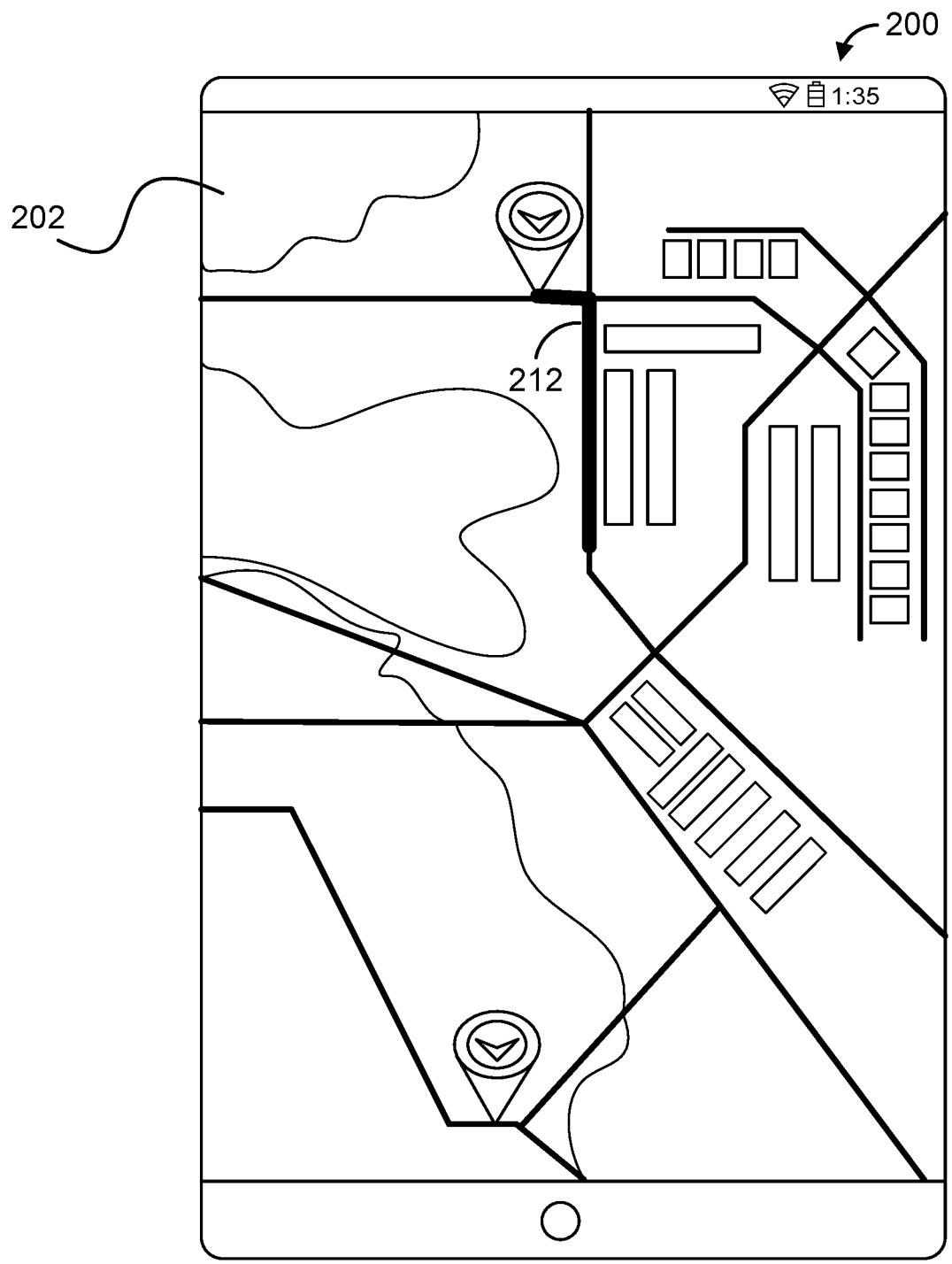
FIG. 2B is the example GUI of FIG. 2A, but in a second state.

Turning to FIG. 2B, FIG. 2B depicts the GUI of mobile computing device 200 depicted in FIG. 2A, but in a second state, which the mobile computing device can display in response to the potential passenger selecting the ride-sharing request icon 210. Specifically, in FIG. 2B, computing device 200 displays an active ride-sharing session route 212 (e.g., based on the potential passenger selecting ride-sharing session request icon 210). During this active ride-sharing session, the mobile computing device 200 has also begun capturing audio content.

In line with discussion above in this example, once the passenger accepts the requested ride via ride-sharing session request icon 210, mobile computing device 200 can also determine whether that the ride-sharing session is active (e.g., responsive to the user requesting the ride, responsive to the driver accepting the requested ride, responsive to detecting that the ride-sharing software application is navigating the vehicle to the passenger's destined location).

At or around the time the mobile computing device 200 determines that the ride-sharing session is active, the mobile computing device 200 can also capture audio content from its environment (and can do so in a number of ways). For example, computing device 200 can use one or more microphones on the mobile computing device 200 to capture audio content playing in the surrounding environment at or around the time the ride-sharing session becomes active.

In another example, the mobile computing device 200 can continuously (or periodically) monitor audio content that is being played in the environment of the computing device and begin capturing the audio content for purposes of song detection only upon recognizing one or more predetermined phrases that indicate that the ride-sharing session is active (e.g., "Activate ride-share song detection"). In this way, the audio content in the environment around the mobile computing device 200 can be monitored for purposes of determining that the ride-sharing session is active and/or is about to become active.

In another example, the mobile computing device 200 can periodically monitor and/or capture audio content and associate some of the captured audio content with the corresponding ride-sharing session route segment based on timing information of the captured audio content. For example, the mobile computing device 200 can capture audio content periodically (e.g., record 1 second of audio content every 30 seconds), associate time data with that captured audio content (e.g., a timestamp), and then associate the captured audio data (and/or data pertaining to the captured audio content) with the ride-sharing session route segment at a later time based on shared (or similar) time data between the captured audio and the ride-sharing session (or various portions thereof).

In a further aspect, at or around the time the computing device uses the microphone to capture audio content during the ride-sharing session, the computing device can also determine locations of the computing device over the course of the ride-sharing session (e.g., using GPS) and output, in connection with the indication of the identified reference audio content, an indication of the determined locations. Other examples are possible.

In any case, mobile computing device 200 can also use the captured audio content to identify reference audio content that has at least a threshold extent of similarity with the captured audio content. And the mobile computing device 200 can use the captured audio content to identify reference audio content in a number of ways.

In one example, the mobile computing device 200 itself can generate audio fingerprint data based on the captured audio content (e.g., by processing the captured audio content locally) and then send the generated audio fingerprint data to a second computing device (e.g., a network server) with an instruction that causes the second computing device to compare the generated audio fingerprint data to a plurality of reference audio fingerprint items. Once the second computing device performs this comparison, the mobile computing device 200 can receive, from the second computing device, an indication of a particular reference audio fingerprint item that has at least a threshold extent of similarity with the generated audio fingerprint data. This similarity may indicate a match between the captured audio content and known reference audio content, thereby allowing the mobile computing device 200 to display information about the captured audio content based on its similarity to the known reference audio content.

In another example, the mobile computing device 200 can identify the reference audio content locally by generating audio fingerprint data of the captured audio content and comparing the generated audio fingerprint data to a plurality of locally stored reference audio fingerprint items, each of which are associated with respective reference audio content. Then, based on this comparison, the mobile computing device 200 can also determine that a particular reference audio fingerprint item has at least a threshold extent of similarity with the generated audio fingerprint data.

In yet another example, the mobile computing device 200 can send a portion of the captured audio content to a second computing device (e.g., a network server) with an instruction that causes the second computing device to compare, at least, the portion of the captured audio content to the plurality of reference audio content items. Such a comparison can involve the second computing device generating an audio fingerprint of the portion of the captured audio content and comparing the generated audio fingerprint to respective reference audio fingerprints, each of which can correspond to a respective reference audio content item. Then, once the second computing device performs this comparison, mobile computing device 200 may receive, from the second computing device, an indication of a particular reference audio content item that has at least the threshold extent of similarity with the captured audio content.

In any case, based on the results of this comparison, the mobile computing device 200 can identify and display metadata associated with this reference audio content that has at least the threshold extent of similarity with the generated audio fingerprint data. For instance, in the above examples, the plurality of reference audio content items can each include or otherwise be associated with respective metadata. As such, the mobile computing device 200 can identify the respective metadata included in or associated with the reference audio content item that has at least the threshold extent of similarity with the generated audio fingerprint data. The metadata can include various information identifying its associated reference audio content. For instance, the metadata can include a song title, artist, genre, album title, release year, or various other information for the reference audio content.

Further, the mobile computing device 200 can use this identified metadata associated with the identified reference audio content item in a number of ways. In one example, the mobile computing device 200 can store the metadata in association with a completed ride-sharing session (or portions thereof). In particular, the mobile computing device 200 can store the metadata in association with the completed ride-sharing session.

Figure 2C:
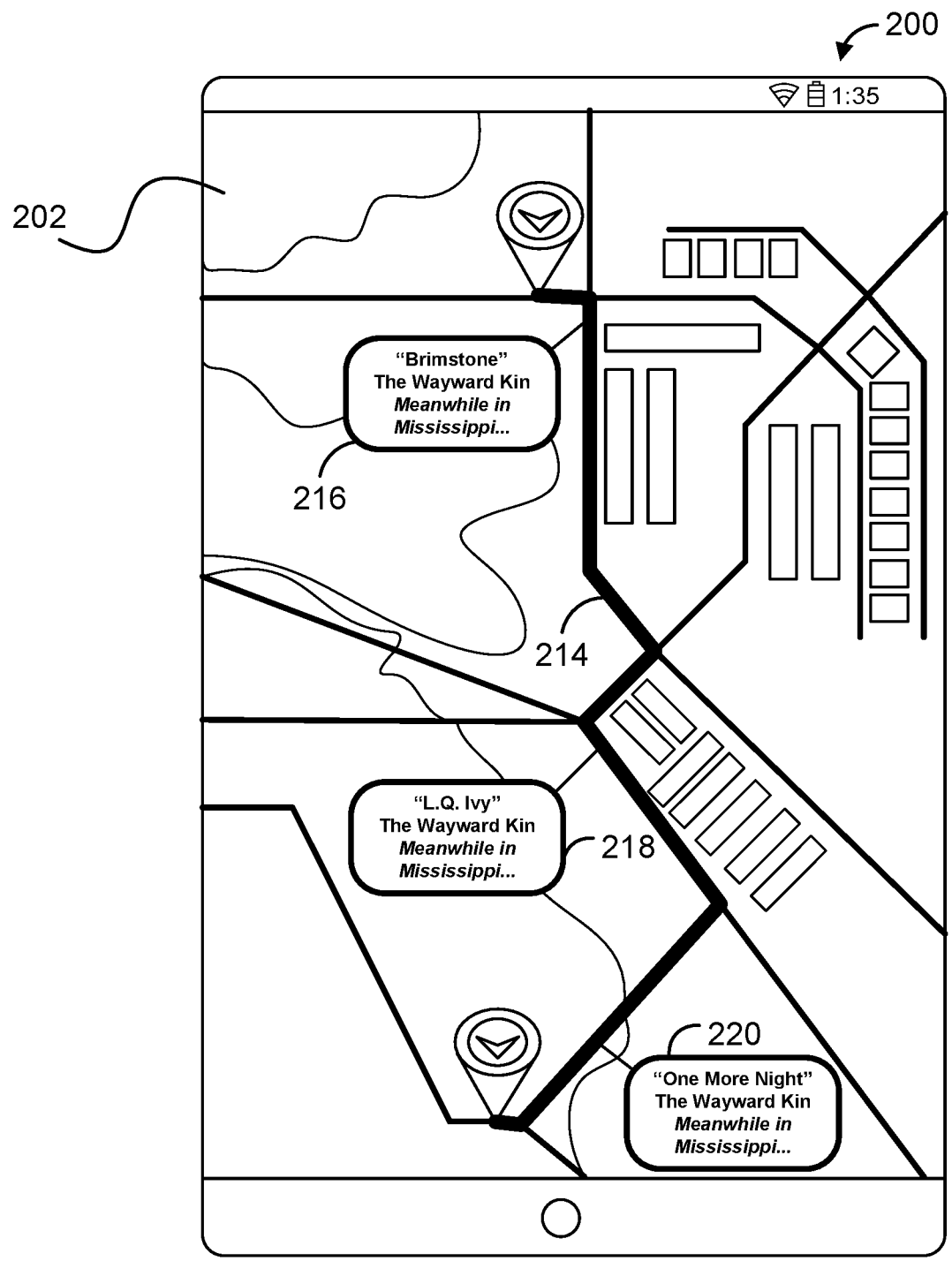
FIG. 2C is the example GUI of FIG. 2A, but in a third state.

Turning to FIG. 2C, the GUI of the mobile computing device 200 is shown in a third state. The third state is similar to the second state depicted in FIG. 2B, in that the mobile computing device 200 has captured audio content and used that captured audio content to identify reference audio content having at least a threshold similarity with the captured audio content. However, in this third state, the ride-sharing session has ended and, based on the results of this comparison, mobile computing device 200 displays metadata associated with the identified reference audio content in a GUI. For example, mobile computing device 200 can be configured to display this metadata concurrently with a map and an indication of the route segments contained in the completed ride-sharing session.

As shown in FIG. 2C, computing device 200 displays a completed ride-sharing session route 214 and, once the ride-sharing session is completed, the mobile computing device 200 displays metadata associated with the completed ride-sharing session as one or more overlays corresponding to each identified reference audio content item from the ride-sharing session—here, a first overlay 216, a second overlay 218, and a third overlay 220. In this manner, when the ride-sharing session is completed, the metadata associated with the identified reference audio content is displayed concurrently with the displayed map 202 and the completed ride-sharing session route 214 (collectively referred to herein as an "audio playout report"). Further, because the identified reference audio content has at least the threshold extent of similarity with the captured audio content from the environment of the mobile computing device 200 at or around the time the ride-sharing session was active, this displayed metadata can provide identifying information of that audio content from the environment of the mobile computing device 200.

For example, as shown in FIG. 2C, in connection with the displayed map 202 and completed ride-sharing session route 214, metadata associated with the audio content played during different segments of the ride-sharing session is depicted. Specifically, FIG. 2C shows metadata associated with: (1) a first reference audio content corresponding to audio content played during the first segment of the ride-sharing session (shown here as first overlay 216, which includes the song title "Brimstone," the artist name "The Wayward Kin," and the album title "Meanwhile in Mississippi . . . "); (2) a second reference audio content corresponding to audio content played during the second segment of the ride-sharing session (shown here as second overlay 218, which includes the song title "L.Q. Ivy," the artist name "The Wayward Kin," and the album title "Meanwhile in Mississippi . . . "); and (3) a third reference audio content corresponding to audio content played during the third segment of the ride-sharing session (shown here as third overlay 220, which includes the song title "One More Night," the artist name "The Wayward Kin," and the album title "Meanwhile in Mississippi . . . "). Displaying this information may improve the passenger's overall ride-sharing experience, as well as help the passenger remember and/or play back the songs played during the ride-sharing session. Other examples are possible.

Figure 2D:
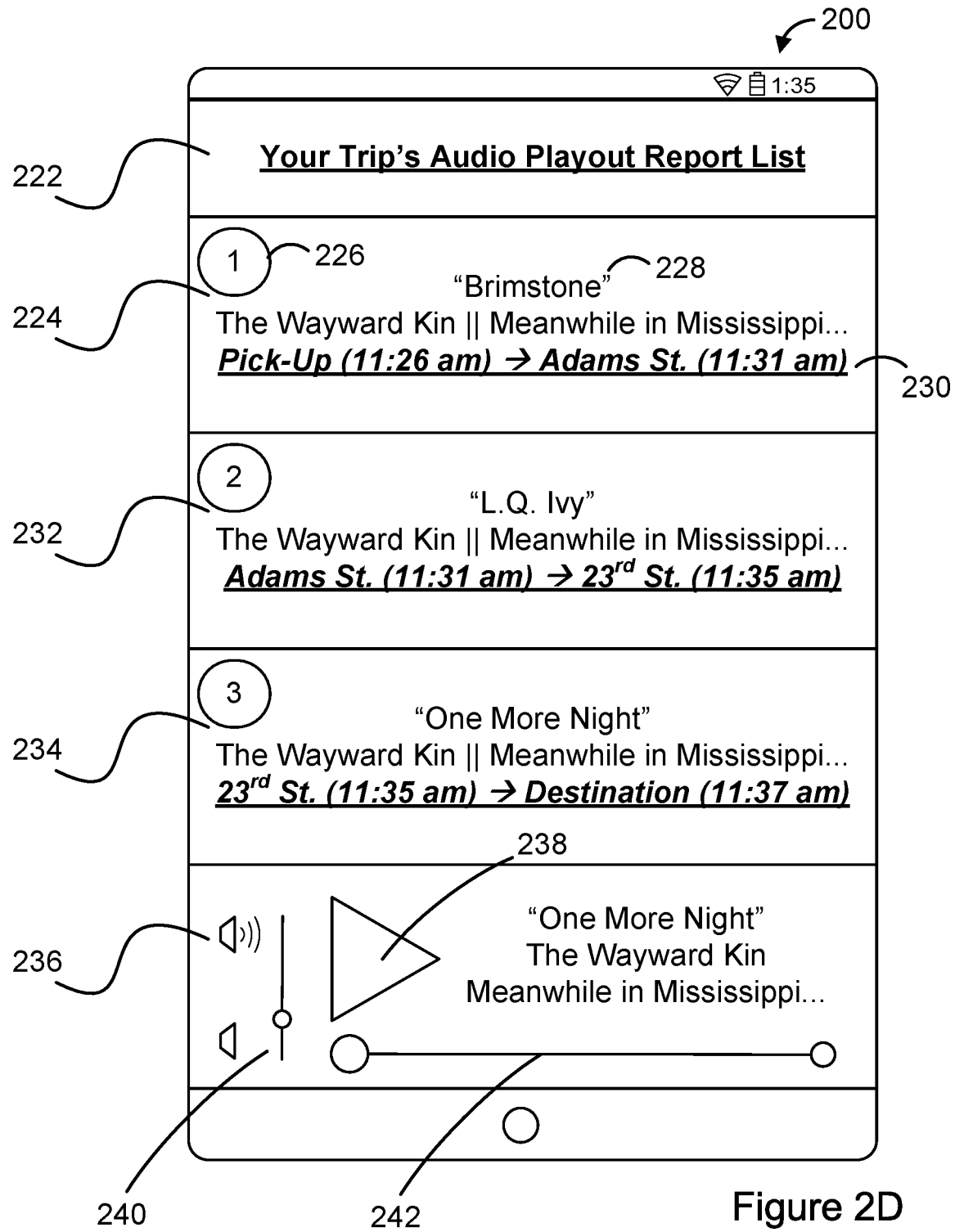
FIG. 2D is the example GUI of FIG. 2A, but in a fourth state.

For example, turning to FIG. 2D, the GUI of the mobile computing device 200 is shown in a fourth state. The fourth state is similar to the third state depicted in FIG. 2C, in that the ride-sharing session has ended, the mobile computing device 200 has captured audio content, used that captured audio content to identify reference audio content having at least a threshold similarity with the captured audio content, and, based on the results of this comparison, generated an audio playout report that displays metadata associated with this reference audio content in a GUI. In FIG. 2D, unlike FIG. 2C, the resultant playout report is presented as a list of reference audio content corresponding to the audio content played during the ride-sharing session and metadata associated therewith, and the mobile computing device 200 further provides a mechanism to play back one or more versions of the previously captured audio content.

As shown in FIG. 2D, computing device 200 displays an audio playout report list 222 (captioned here as "Your Trip's Audio Playout Report List") containing metadata associated with audio content played during the ride-sharing session. In this example, FIG. 2D shows, as the first entry in the displayed audio playout report list 222, metadata associated with a first reference audio content corresponding to audio content played during the first segment of the ride-sharing session (shown here as first list entry 224, which includes: (1) play order indicator 226 (here, "1," indicating that it was the first song played during the ride-sharing session); (2) reference audio content metadata 228 (which, here, includes a song title ("Brimstone"), an artist name ("The Wayward Kin") and an album title ("Meanwhile in Mississippi . . . "); and (3) route segment details indicator 230 (which displays details associated with the route segment corresponding to the particular audio content playing during that segment of the route (shown here as the beginning and ending locations and times of the first route segment ("Pick-Up (11:26 am) Adams St. (11:31 am)"). Also, as shown in FIG. 2D, second list entry 232 and third list entry 234 contain similarly compiled metadata and information.

In FIG. 2D, as noted above, this metadata can also include various identifying information of the audio content, such that the mobile computing device 200 can use metadata to retrieve and play a version of the identified audio content. Specifically, in this fourth state, however, mobile computing device 200 is configured to play back the identified reference audio content while displaying audio playout report list 222.

As shown also shown in FIG. 2D, the GUI can further include audio playback controls 236 that allow the user to interact with and control play back of the identified reference the audio content (here, the third reference audio content, entitled "One More Night") while viewing audio playout report list 222. The audio playback controls 236 can include a play/pause button 238, one or more volume controls 240, and a tracking slider 242 for navigating through playback of the audio content. Other examples are possible as well.

The mobile computing device 200 can be configured to play back the identified reference audio content in a number of ways. For example, the mobile computing device 200 can use the stored metadata to retrieve and playback the reference audio content. For example, responsive to the mobile computing device 200 receiving a selection of a particular reference audio content displayed in the audio playout report list 222 (e.g., by a user selecting the third list entry 234), the mobile computing device 200 can retrieve and play back a copy of the selected reference audio content. In other examples, responsive to the mobile computing device 200 receiving a request to play audio content via the audio playback controls 236, the mobile computing device 200 can retrieve and play back a copy of the reference audio content. In some examples, the reference audio content identified by the metadata can be stored locally on the mobile computing device 200, and the mobile computing device 200 can retrieve and play back the locally-stored reference audio content. Alternatively, the mobile computing device 200 can retrieve the reference audio content from one or more streaming services (e.g., SPOTIFY®, AMAZON MUSIC®, etc.). By using a streaming service to play back the reference audio content, the mobile computing device 200 can reduce the amount of data that is stored locally.

In some examples, the mobile computing device 200 can use an audio fingerprint to retrieve and play back the reference audio content. For instance, as part of the process of identifying the reference audio content that has at least the threshold extent of similarity with the captured audio content, the mobile computing device 200 can locally store an audio fingerprint of the identified reference audio content in association with the list entry. And in order to retrieve the reference audio content for playback, the mobile computing device 200 can query a database of audio fingerprints and corresponding audio content to identify and retrieve audio content that matches the audio fingerprint associated with the list entry. Other examples and functionalities are possible.

Figure 2E:
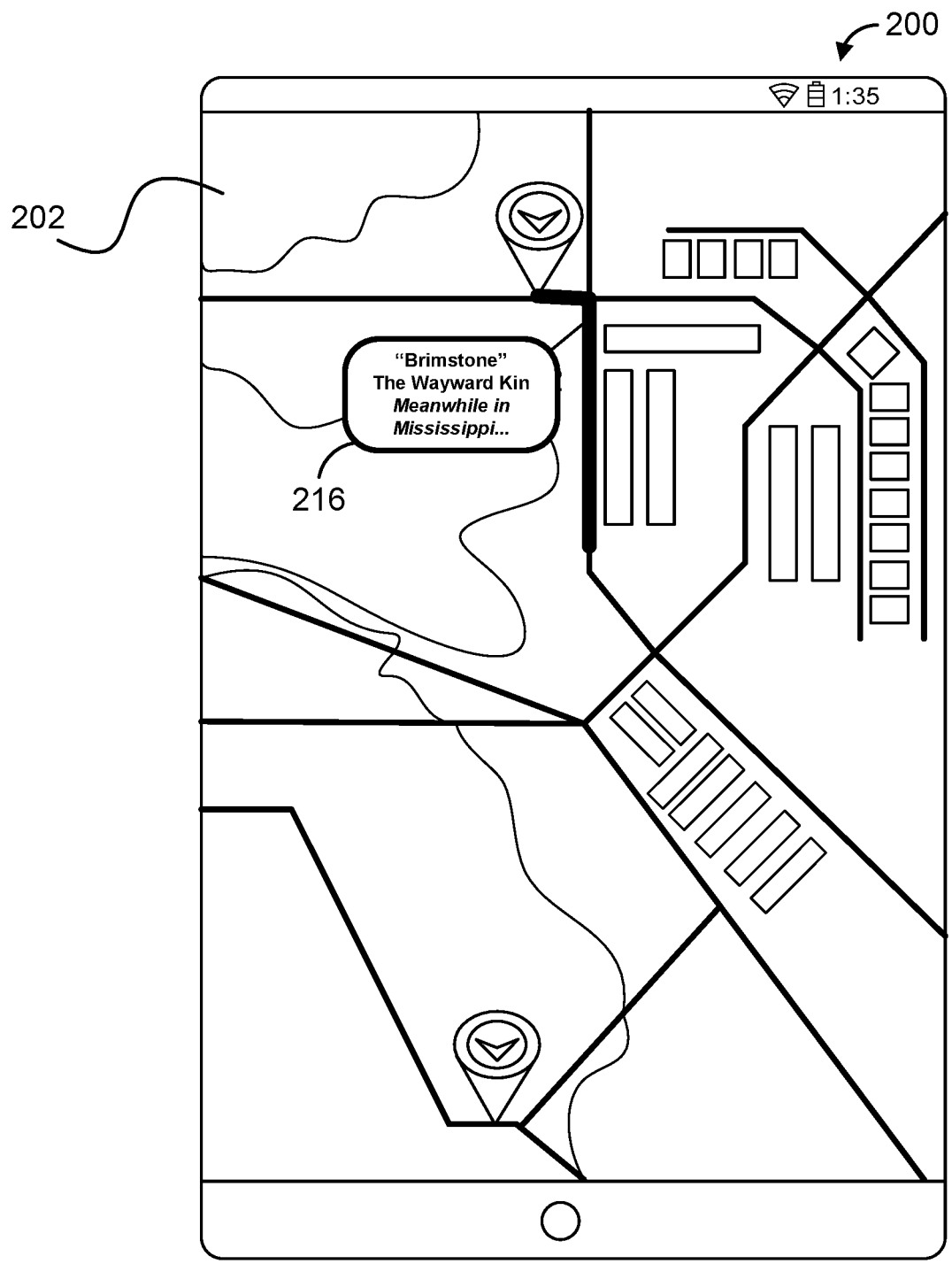
FIG. 2E is the example GUI of FIG. 2A, but in a fifth state.

Turning to FIG. 2E, the GUI of the mobile computing device 200 is shown in a fifth state. The fifth state is similar to the second state depicted in FIG. 2B, in that the mobile computing device 200 displays an active ride-sharing session route and has begun capturing audio content. Unlike FIG. 2B, in FIG. 2E mobile computing device 200 has also used the captured audio content to identify reference audio content having at least a threshold similarity with the captured audio content, and, based on the results of this comparison, displayed metadata associated with this reference audio content in the GUI. As shown, the identified reference audio content includes a first reference audio content corresponding to audio content played during the first segment of the ride-sharing session (first overlay 216, which includes the song title "Brimstone," the artist name "The Wayward Kin," and the album title "Meanwhile in Mississippi . . . "). Thus, unlike FIG. 2B, FIG. 2E depicts the display of this metadata in real time as the ride-sharing session progresses, instead of, for example, upon completion of the ride-sharing session.

B. Example Methods

Figure 3:
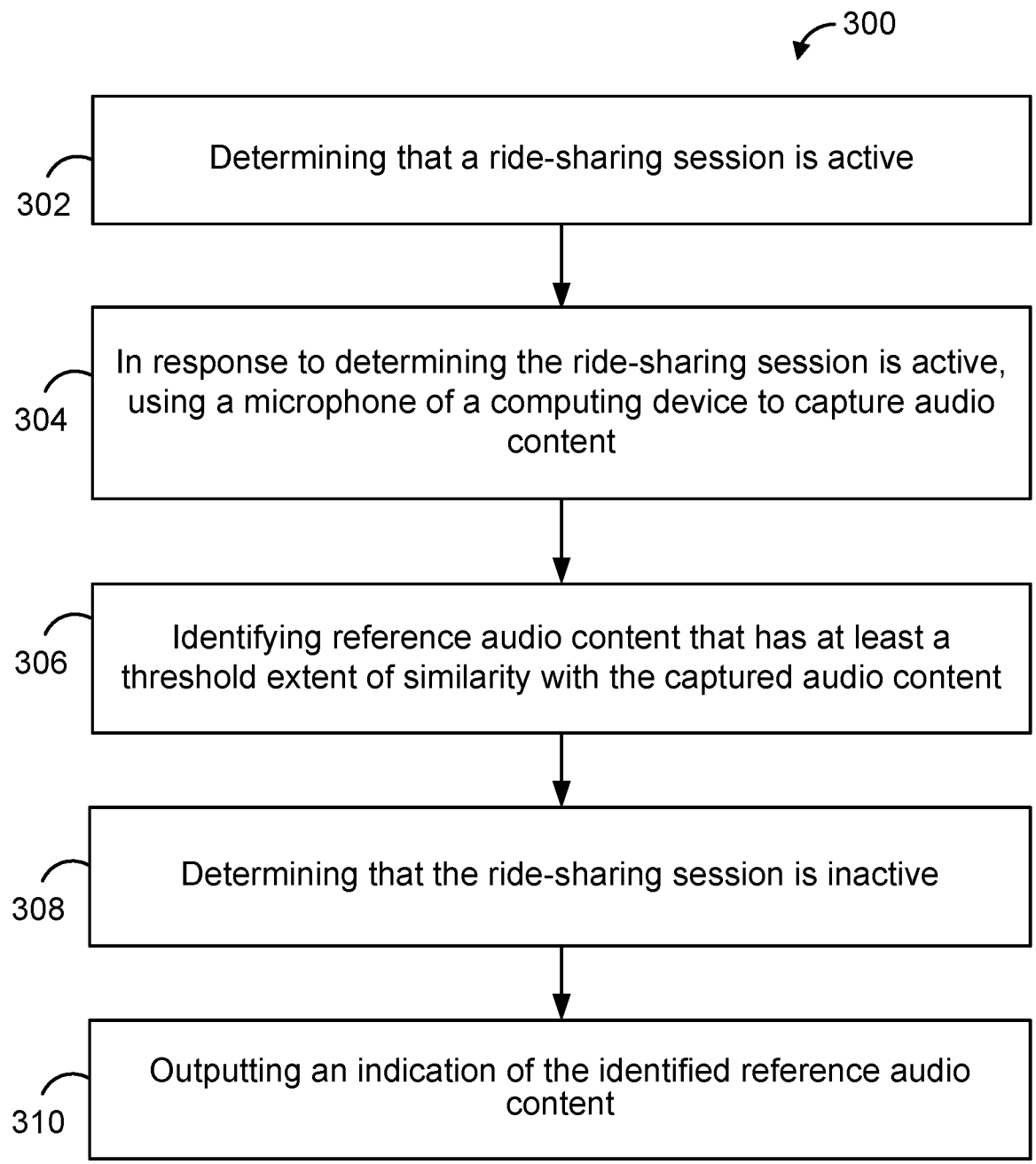
FIG. 3 is a flow chart of an example method.

FIG. 3 is a flow chart illustrating an example method 300.

At block 302, the method 300 can include determining that a ride-sharing session is active. In some examples, determining that the ride-sharing session is active comprises (i) receiving, via a ride-sharing application on a computing device, a ride-sharing request, (ii) receiving, via the ride-sharing application, an indication that a driver has accepted the ride-sharing request, and (iii) determining that the ride-sharing application is navigating the driver to a predetermined location.

At block 304, the method 300 can include, in response to determining the ride-sharing session is active, using the microphone of the computing device to capture audio content. In line with the discussion above, using the microphone to capture audio content can involve using the microphone to capture audio content that is playing in an environment of the computing device. In some examples, using the microphone of the computing device to capture audio content comprises (i) using the microphone of the computing device to capture first audio content during a first portion of the ride-sharing session and (ii) using the microphone of the computing device to capture second audio content during a second portion of the ride-sharing session.

At block 306, the method 300 can include identifying reference audio content that has at least a threshold extent of similarity with the captured audio content. In some examples, the computing device is a first computing device further comprising a communication interface for communicating with a second computing device. The second computing device can include data storage having stored thereon a plurality of reference audio content items. In these examples, identifying the reference audio content that has at least the threshold extent of similarity with the captured audio content can involve sending, to the second computing device, (i) at least a portion of the captured audio content and (ii) an instruction that causes the second computing device to compare at least the portion of the captured audio content to the plurality of reference audio content items. Identifying the reference audio content that has at least the threshold extent of similarity with the captured audio content can further involve receiving, from the second computing device, an indication of a particular reference audio content item of the plurality of reference audio content items that has at least the threshold extent of similarity with the captured audio content.

In some examples, the second computing device can include data storage having stored thereon a plurality of reference audio fingerprint items. In these examples, identifying the reference audio content that has at least the threshold extent of similarity with the captured audio content can involve generating audio fingerprint data of the captured audio content and sending, to the second computing device, (i) the generated audio fingerprint data of the captured audio content and (ii) an instruction that causes the second computing device to compare the generated audio fingerprint data to the plurality of reference audio fingerprint items. Identifying the reference audio content that has at least the threshold extent of similarity with the captured audio content can further involve receiving, from the second computing device, an indication of a particular reference audio fingerprint item of the plurality of reference audio fingerprint items that has at least the threshold extent of similarity with the generated audio fingerprint data.

In some examples, identifying the reference audio content that has at least the threshold extent of similarity with the captured audio content can involve the computing device generating audio fingerprint data of the captured audio content and comparing the generated audio fingerprint data to a plurality of reference audio fingerprint items, wherein each respective audio fingerprint item is associated with respective reference audio content. The computing device can determine that a particular reference audio fingerprint item of the plurality of reference audio fingerprint items has at least the threshold extent of similarity with the generated audio fingerprint data. And the computing device can identify the reference audio content that has at least the threshold extent of similarity with the captured audio content as the respective reference audio content associated with the particular reference audio fingerprint item.

In some examples, identifying reference audio content that has the threshold extent of similarity with the captured audio content comprises (i) identifying first reference audio content that has at least the threshold extent of similarity with the captured first audio content and (ii) identifying second reference audio content that has at least the threshold extent of similarity with the captured second audio content.

At block 308, the method 300 can include determining that the ride-sharing session is inactive.

At block 310, the method 300 can include outputting an indication of the identified reference audio content. In some examples, outputting the indication of the identified reference audio content comprises (i) outputting a first indication of the identified first reference audio content and (ii) outputting a second indication of the identified second reference audio content. In other examples, outputting the indication of the identified reference audio content further comprises (i) displaying a map identifying a route taken during the ride-sharing session, wherein the map identifies (a) a first segment of the route that corresponds to the first portion of the ride-sharing session and (b) a second segment of the route that corresponds to the second portion of the ride-sharing session; (ii) displaying, in connection with the first segment of the route, the first indication of the identified first reference audio content; and (iii) displaying, in connection with the second segment of the route, the second indication of the identified second reference audio content. In yet other examples, outputting the indication of the identified reference audio content comprises outputting the reference audio content (e.g., playing back audio content via the computing device).

In some examples, the method 300 can also include identifying metadata associated with the identified reference audio content, wherein outputting the indication of the identified reference audio content comprises displaying an indication of the metadata associated with the identified reference audio content. The metadata can include one or more of (i) a song title, (ii) an artist, (iii) a genre, (iv) an album title, or (v) a release year.

In some examples, the method 300 can also include determining a location of the computing device at or around the time the computing device used the microphone of the computing device to capture audio content and outputting, in connection with the indication of the identified reference audio content, an indication of the determined location.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects.

I claim:

1. A non-transitory computer-readable medium, having stored thereon program instructions that, upon execution by a computing device, cause the computing device to perform a set of operations comprising:
    determining that a ride-sharing session is active;
    while the ride-sharing session is active, capturing audio content;
    identifying reference audio content that matches the captured audio content; and
    outputting an indication of the identified reference audio content.

2. The non-transitory computer-readable medium of claim 1, wherein determining that the ride-sharing session is active comprises receiving, via a ride-sharing application on the computing device, a ride-sharing request.

3. The non-transitory computer-readable medium of claim 1, wherein determining that the ride-sharing session is active comprises receiving, via a ride-sharing application, an indication that a driver has accepted a ride-sharing request.

4. The non-transitory computer-readable medium of claim 1, wherein determining that the ride-sharing session is active comprises determining that a ride-sharing application is navigating a driver to a predetermined location.

5. The non-transitory computer-readable medium of claim 1, wherein the audio content comprises music content.

6. The non-transitory computer-readable medium of claim 1, wherein the audio content comprises audio content other than music.

7. The non-transitory computer-readable medium of claim 1, wherein the computing device is a first computing device further comprising a communication interface for communicating with a second computing device, wherein the second computing device comprises data storage having stored thereon a plurality of reference audio content items, and wherein identifying the reference audio content that matches the captured audio content comprises:
    sending, to the second computing device, (i) at least a portion of the captured audio content and (ii) an instruction that causes the second computing device to compare at least the portion of the captured audio content to the plurality of reference audio content items; and
    receiving, from the second computing device, an indication of a particular reference audio content item of the plurality of reference audio content items that matches the captured audio content.

8. The non-transitory computer-readable medium of claim 1, wherein identifying the reference audio content that matches the captured audio content comprises:
    generating audio fingerprint data of the captured audio content;
    comparing the generated audio fingerprint data to a plurality of reference audio fingerprint items, wherein each respective audio fingerprint item is associated with respective reference audio content;
    determining that a particular reference audio fingerprint item of the plurality of reference audio fingerprint items that has at least a threshold extent of similarity with the generated audio fingerprint data; and
    identifying the reference audio content that has at least the threshold extent of similarity with the captured audio content as the respective reference audio content associated with the particular reference audio fingerprint item.

9. The non-transitory computer-readable medium of claim 1, wherein capturing audio content comprises, while the ride-sharing session is active, capturing audio content via a microphone of the computing device.

10. The non-transitory computer-readable medium of claim 1, wherein the set of operations further comprises identifying metadata associated with the identified reference audio content.

11. The non-transitory computer-readable medium of claim 10, wherein the metadata comprises one or more of (i) a song title, (ii) an artist, (iii) a genre, (iv) an album title, or (v) a release year.

12. The non-transitory computer-readable medium of claim 10, wherein outputting the indication of the identified reference audio content comprises displaying an indication of the metadata associated with the identified reference audio content.

13. A method to be performed by a computing device, the method comprising:
    determining that a ride-sharing session is active;
    while the ride-sharing session is active, capturing audio content;
    identifying reference audio content that matches the captured audio content; and
    outputting an indication of the identified reference audio content.

14. The method of claim 13, wherein determining that the ride-sharing session is active comprises receiving, via a ride-sharing application on the computing device, a ride-sharing request.

15. The method of claim 13, wherein determining that the ride-sharing session is active comprises receiving, via a ride-sharing application, an indication that a driver has accepted a ride-sharing request.

16. The method of claim 13, wherein determining that the ride-sharing session is active comprises determining that a ride-sharing application is navigating a driver to a predetermined location.

17. The method of claim 13, wherein the audio content comprises music content.

18. The method of claim 13, wherein the audio content comprises audio content other than music.

19. The method of claim 13, wherein capturing audio content comprises, while the ride-sharing session is active, capturing audio content via a microphone of the computing device.

20. A computing device comprising:
    one or more processors; and
    a non-transitory computer-readable medium, having stored thereon program instructions that, upon execution by a computing device, cause the one or more processors to perform a set of operations comprising:
        determining that a ride-sharing session is active;
        while the ride-sharing session is active, capturing audio content;
        identifying reference audio content that matches the captured audio content; and outputting an indication of the identified reference audio content.

\* \* \* \* \*